(12) United States Patent
Dove et al.

(10) Patent No.: US 8,452,808 B2
(45) Date of Patent: May 28, 2013

(54) AUTOMATIC GENERATION OF VIRTUAL DATABASE SCHEMAS

(75) Inventors: Bryan Dove, Seattle, WA (US); Jonathan Alan Handler, Northbrook, IL (US)

(73) Assignee: Microsoft Corporation, Redmond, WA (US)

( * ) Notice: Subject to any disclaimer, the term of this patent is extended or adjusted under 35 U.S.C. 154(b) by 404 days.

(21) Appl. No.: 12/715,409

(22) Filed: Mar. 2, 2010

(65) Prior Publication Data

US 2011/0219028 A1     Sep. 8, 2011

(51) Int. Cl.
*G06F 7/14* (2006.01)
*G06F 17/30* (2006.01)

(52) U.S. Cl.
USPC .......................... 707/770; 707/717; 707/803

(58) Field of Classification Search
USPC ....... 707/999.003, 999.004, 999.01, 999.102, 707/999.107, 770, 803, 717, 966, 999.1, 707/804
See application file for complete search history.

(56) References Cited

U.S. PATENT DOCUMENTS

| | | | |
|---|---|---|---|
| 7,200,805 | B2 | 4/2007 | Carlson et al. |
| 7,319,996 | B2 | 1/2008 | Chen et al. |
| 7,630,956 | B2 | 12/2009 | Wyatt et al. |
| 2004/0034666 | A1 | 2/2004 | Chen |
| 2005/0234889 | A1 | 10/2005 | Fox et al. |
| 2006/0136452 | A1 | 6/2006 | Lim et al. |
| 2009/0043746 | A1 | 2/2009 | Kanemasa |
| 2009/0248731 | A1* | 10/2009 | Frazier .......................... 707/102 |

OTHER PUBLICATIONS

Motro Amihai, "Superviews: Virtual Integration of Multiple Databases", Retrieved at<<http://cs.gmu.edu/~ami/research/publications/pdf/tse87.pdf>>, Jul. 1987, pp. 14.
Madhanvan, et al., "Structured Data Meets the Web: A Few Observations", Retrieved at<<http://www.eecs.umich.edu/~congy/work/deb06.pdf>>, 2006, pp. 8.
Babic, et al., "The INFOGENMED Project: A Biomedical Informatics Approach to Integrate Heterogeneous Biological and Clinical Information", Retrieved at<<http://www.ercim.eu/publication/Ercim_News/enw60/infogenmed.html>>, Jan. 2005, pp. 2.
Bergamaschi, et al., "A Data Integration Framework for E-commerce Product Classification", Retrieved at<<http://www.dbgroup.unimo.it/prototipo/paper/iswc2002.pdf>>, 2002, pp. 15.

* cited by examiner

*Primary Examiner* — Bruce Moser
(74) *Attorney, Agent, or Firm* — Westman, Champlin & Kelly, P.A.

(57) ABSTRACT

A data consumer is provided with a system that enables automatic generation of a virtual database schema in order to support a customized pattern of data consumption across one or more source databases. In one embodiment, a metadata manager component is configured to facilitate creation of a first data tag and a second data tag. A schema definition manager component is configured to facilitate creation of a data entity that groups the first data tag with the second data tag. A virtual schema generation service component generates the virtual database schema by analyzing the data entity and, based on the grouping of the first data tag with the second data tag, automatically generating and storing a database query statement that, when executed, causes a retrieval of data consistent with data location indicators included in the first and second data tags.

20 Claims, 4 Drawing Sheets

AUTOMATIC GENERATION OF VIRTUAL DATABASE SCHEMAS

BACKGROUND

It is not uncommon for businesses, governmental organizations, and other enterprises to maintain many different kinds of electronic data from disparate sources. For example, health-oriented enterprises will often maintain patient information from many sources, including scanned documents, electrocardiograms, X-rays, MRI scans and other medical imaging procedures, lab results, dictated reports of surgery, as well as patient demographics and contact information. There are challenges associated with providing a computing platform that enables customized retrieval and display of data across so many different kinds of data from so many different sources.

Some of the challenges arise from the fact that, at any given point in time, traditional databases generally will only exist in a single physical expression (e.g., only one table structure implementation). However, the pattern of data consumption is ideally malleable by consumer, as each consuming client has variant needs. The situation is further complicated by the fact that the number of data consumers is likely to grow over time. Each consumer generally requires a consistent data consumption profile regardless of any change over time to the original data sources. Currently, changes to upstream source systems create exponential amounts of derivative work necessary to update and support consuming systems.

The discussion above is merely provided for general background information and is not intended for use as an aid in determining the scope of the claimed subject matter.

SUMMARY

In order to address at least some of these concerns, a data consumer is provided with a system that enables automatic generation of a virtual database schema in order to support a customized pattern of data consumption across one or more source databases. In one embodiment, a metadata manager component is configured to facilitate creation of a first data tag and a second data tag. A schema definition manager component is configured to facilitate creation of a data entity that groups the first data tag with the second data tag. A virtual schema generation service component generates the virtual database schema by analyzing the data entity and, based on the grouping of the first data tag with the second data tag, automatically generating and storing a database query statement that, when executed, causes a retrieval of data consistent with data location indicators included in the first and second data tags.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Embodiments disclosed herein pertain to a system provided to a data consumer to enable automatic generation of a virtual database schema. The virtual database schema supports a customized pattern of data consumption across one or more source databases. The system illustratively includes a metadata manager component configured to facilitate creation of a first data tag and a second data tag. The first data tag includes an indication of a first data vector that identifies where in a first of the plurality of source databases a first item of data is stored. The second data tag includes an indication of a second data vector that identifies wherein in a second of the plurality of source databases a second item of data is stored. The system also includes a schema definition manager component configured to facilitate creation of a data entity. The data entity includes a grouping of the first data tag with the second data tag. Finally, the system includes a virtual schema generation service component that generates the virtual database schema by analyzing the data entity and, based on the grouping of the first data tag with the second data tag, automatically generating and storing a database query statement that, when executed, causes a retrieval of the first and second items of data.

Figure 1:
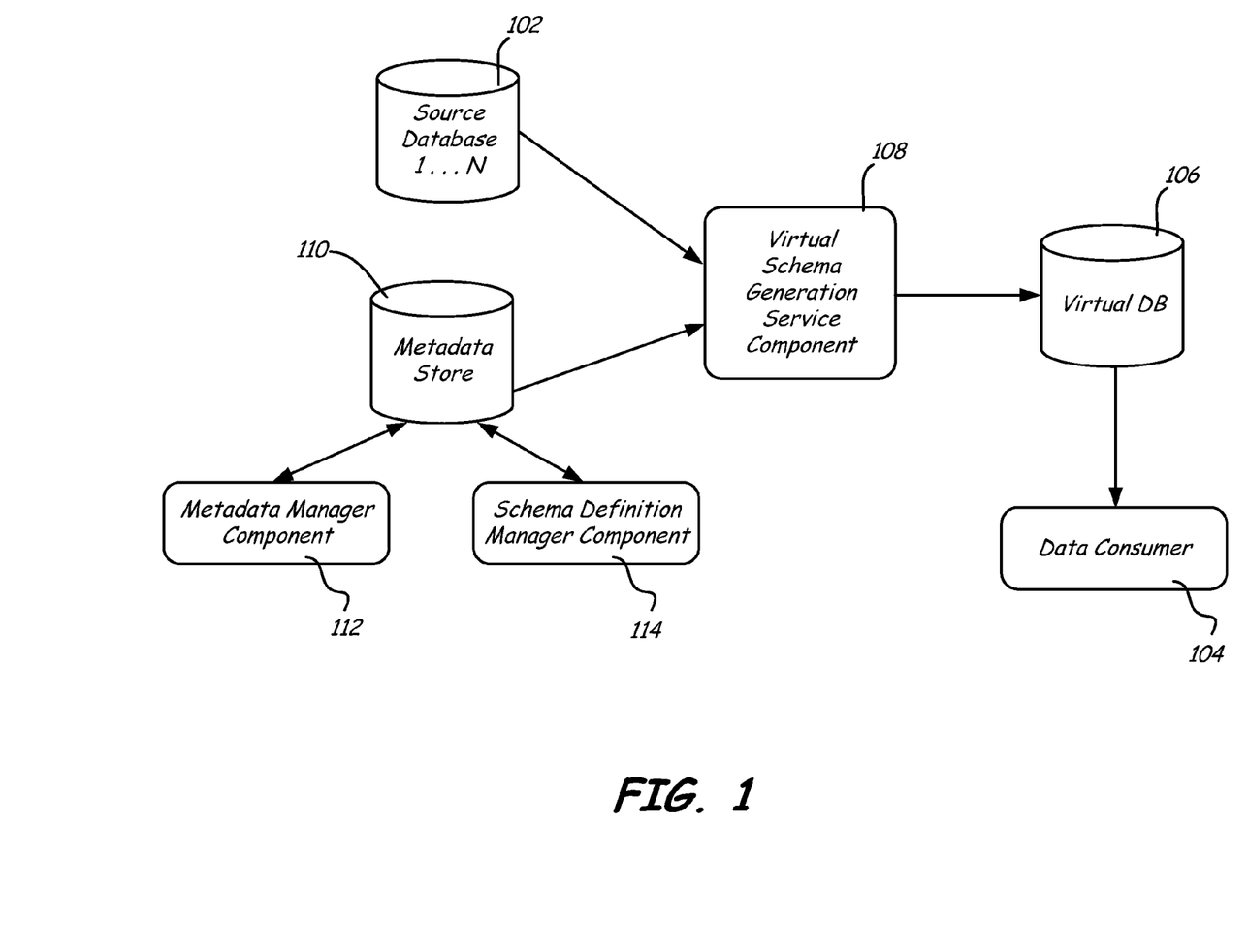
FIG. 1 is a block diagram of one embodiment of a virtual database system.

FIG. 1 provides a more detailed example of one exemplary embodiment of a virtual database system. This Figure is a block diagram of a virtual database system 100. System 100 includes one or more (i.e., any number 1 up to N) of source databases 102. Databases 102 may contain a variety of different kinds of data and may come from multiple different data sources. For example, assuming that system 100 is implemented in the context of a health-oriented enterprise, a context to which the scope of the present invention is not limited, databases 102 are likely to include different kinds of patient information from multiple sources. The collections might include scanned documents, electrocardiograms, X-rays, MRI scans and other medical imaging procedures, lab results, dictated reports of surgery, as well as patient demographics and contact information.

System 100 also includes a consumer 104 (e.g., a data consuming application). In actuality, system 100 may include a plurality (i.e., any number 1 up to N) of data consumers 104 (e.g., a plurality of data consuming applications). Each consumer 104 benefits from an ability to conveniently access and share the disparate data of databases 102. However, enabling physical access to the data in databases 102 is only part of the challenge. The data in databases 102 is not necessarily consistent from one database to the next at least in terms of how the data is stored. While some consumers 104 may subscribe to a common data storage/organization/access scheme reflected possibly in some but not all of databases 102, other consumers that desire to access databases 102 may prefer a different data storage/organization/access scheme.

Accordingly, each consumer 104 will benefit from the ability to access the information in databases 102 based on its own retrieval and display preferences. In one embodiment, in order to facilitate this ability, each consumer 104 is provided with their own version of a virtual database 106 that enables a unique, customized perspective into the data of databases 102. This is accomplished, at least in part, through implementation of a customizable virtual database schema in accordance with which the information in databases 102 is accessed. Thus, each virtual database 106 enables its respective consumer 104 to access the information in databases 102 utilizing the consumer's own data storage/organization/access scheme. This is done without sacrificing the ability of other consumers to access and attach a different meaning to the same data. Having different virtual databases 106, including different virtual database schemas, makes it possible for different consumers 104 to maintain their own preferred interface into the data of databases 102.

Within a given data domain, though two consumers 104 may prefer different data storage/organization/access schemes, there is typically significant overlap in terms of the actual data likely to be frequently of interest from one consumer 104 to the next. Continuing with the example assumption that system 100 is implemented within the health enterprise domain, it is common for there to be significant overlap between separate health-related applications (e.g., separate consumers 104 involved in patient management) in terms of a desire to access certain individual data components of databases 102. For example, multiple applications may have an interest in the names of patients. Unfortunately, while patient name might be stored in one location in one database 102, it just as easily might be stored in a totally different location in a different database 102. There also may be discrepancies from one database 102 to the next in terms of the format in which a patient's name is stored. There may even be data location and format inconsistencies within a single database 102. In order to support generation of a virtual database 106, a determination is illustratively made as to how and where data items such as the patient name are located in the various databases 102. In one embodiment, a process is applied to generate a record of data vectors that point into the databases 102 so as to identify how and where individual items of data are stored. This process is illustratively accomplished through identification (e.g., by way of human input or a partially or fully automated process) of a data pointer or other mapping mechanism that links each individual item of data to a corresponding storage location in the databases 102. As will become apparent, these data vectors are reflected in the virtual database schema of the virtual database 106 and relied upon to give the data consumer 104 unified access to the underlying data components spread across one or more databases 102. It is to be understood that, in one embodiment, the data pointer or other mapping mechanism is configured such that a single "patient name" data concept is expressed as a single field entry in a database table, an expression based upon multiple fields, or multiple individual fields with an order of precedence for selection.

In one embodiment, a set of potentially unique and disparate items of data existing in one or more of databases 102 is presented through the virtual database 106 to the data consumer 104 as a unified data component. The consumer 104 interacts with the unified data component and, by doing so, indirectly interacts with the associated set of disparate data items by triggering one or more corresponding database query operations, as reflected in virtual database 106. The unified data component conceals the actual disparity in databases 102 in terms of how and/or where the actual data is stored. The consumer 104 is able to consume or otherwise interact with the set of disparate data items without having to understand the inconsistencies in terms of how and/or where the individual data components are actually stored in databases 102. The data consumer 104 is essentially isolated from the inconsistencies in favor of an impression that such inconsistencies do not exist.

Continuing with the example assumption that system 100 is implemented within the health enterprise domain, a first host of a database 102 might choose to store a patient name value as two separate fields in a table called Patients. They may have a field called First Name and a field called Last Name. A second host of a different database 102 might choose to list the patient name in a single field within a Patients table. Those skilled in the art will appreciate that this example is a simplification of reality. In actuality, it is not uncommon for a complex organization to have dozens or even hundreds or more different pieces of software that all include an indication of patient name in many different tables in many different formats. The inconsistencies in the treatment of patient name are addressed by presenting a unified patient name data component to data consumer 104 through the virtual database 106. The unified patient name data component conceals the actual disparity in databases 102 in terms of how and/or where the actual patient name data is stored. The consumer 104 consumes or otherwise interacts with the unified patient name data component and, by doing so, indirectly interacts with the actual patient name data in databases by triggering one or more corresponding database query operations, as reflected in the consumer's preferences reflected in the virtual database 106. The consumer 104 is able to consume or otherwise interact with the patient name data in databases 102 without having to understand the inconsistencies in terms of how and/or where the individual patient name data components are actually stored. That is not to say that an ontology is defined. For example, there could be multiple instances of patient name-related data components expressed, and each would be enforced to have a unique name, description, and tag to distinguish it as a unique data entity to the data consumer.

Accordingly, virtual database 106 is illustratively configured to provide the database consumer 104 with a virtual database scheme that enables a consistent, unified impression of an item of data regardless of how the item of data is represented across the different databases 102. For a given item of data (e.g., patient name), a unified entry is included in the schema of virtual database 106. The unified entry points to and unites (e.g., by way of a join and/or union and/or other SQL operation) the various corresponding entries across the databases 102, regardless of how the data item is formatted and regardless of how it is physically stored. For example, a unified entry for "patient name" in the virtual database 106 is illustratively mapped to the corresponding two field entry in the Patient table of the first host and the corresponding single field entry in the Patient table of the second host.

The mapping, which can also be conceptualized as a system of data pointers, is illustratively established by tagging the various data components of the databases 102. During the tagging process, for example, a single "patient name" data concept may be expressed as a single field entry in the Patient table, an expression based upon multiple fields, or multiple individual fields with an order of precedence for selection. It is conceived that the tagging may be conducted on an automatic, semi-automatic or manual basis.

In one embodiment, consistent with FIG. 1, system 100 includes a metadata manager component 112. Component 112 is illustratively a tool that enables metadata descriptive of attributes of data contained within databases 102 to be added to a metadata store 110. While this selection and assignment of the metadata values may be fully or partially automated, the metadata manager component 112 illustratively includes a mechanism that enables users to manually input, into metadata store 110, a plurality of metadata tags that describe data components of one or more databases 102. In one embodiment, data tags are assigned to certain (potentially any) characteristics of data components (e.g., buy not by limitation, properties, fields, values, objects, etc) reflected in databases 102. In one embodiment, not by limitation, the metadata manager component 112 enables a user to freely associate and dissociate data tags with locations within one or more databases 102. Data tags added to metadata store 110 may include, for example but not by limitation, any or all of the following properties:

1) Unique Identifier;
2) Element Name;
3) Element Source;
4) Element Description;
5) Schema Default Name;
6) Schema Default Data type;
7) Source Data Location (e.g., database, table, column, row filter);
8) Data Tag Publisher; and
9) Data Tag Version.

The unique identifier provides a mechanism for identifying and retrieving a tagged data item. The element name and element source components of the tagging scheme provide a way to name the data item and identify an associated source. The schema default name and schema default type enables a setting of how the associated data item will be identified in the context of a generated schema. For example, it may be desirable for a patent name data item to be referred to, within the schema, as P-name, or Patient Name, or PatientName, or some other variation or representation. In another example, it may be desirable for a data item called "Cholesterol Indicator Of Congestive Heart Failure" to be referred to within the schema as something much shorter such as "CHF." The schema default name property enables a default override to a desired value. The schema default data type similar enables a restriction to a certain data type (e.g., string, number, etc.).

The source data location supports creation, for the data item being tagged, of a record of a data vector, which is essentially a pointer to where the data element is located within the database(s) 102. The particular combination of parameters for identifying where the tagged data item is located is flexible and can be adjusted from one implementation to the next depending upon system preferences and requirements. Parameters may include an identification of the server where the data item is located, the database on the server in which the item is located, the table in that database in which the item is located, the column in that table in which the data item is located, and the row in that column in which the data item is located. It is to be understood, however, the source data location need not necessarily be as precise as a directly identified data location. Instead, it may be any data query function. For example, it may be a database query that includes a "where" clause or any other function applied to a data retrieval operation. The general function of the source data location portion of the tagging scheme is to provide a vector to point at a specific location, in a specific database, with a specific set of criteria in accordance with which the tagged data fragment is to be retrieved. It is to be understood that, in one embodiment, the data pointer or other similar mapping mechanism is configured such that a single data concept is expressed as a single field entry in a database table, an expression based upon multiple fields, or multiple individual fields with an order of precedence for selection.

The final two noted elements of the data tagging scheme, namely, the data tag publisher and the data tag version, simply provide a mechanism for creating a record of the tagging operation. For example, the recorded data may include the name of the person or automated system that applied the tag. It may also include a record of the date and/or time upon which the tag was applied.

As has been alluded to, different data consumers 104 (e.g., different data consuming applications) may not share the same perspective in terms of how the data of databases 102 is ideally consumed. It is also possible that a single data consumer 104 may desire multiple perspectives as to how the data is consumed. System 100 includes a schema definition manager component 114 that enables a consumer 104 to dictate, on a customized basis, how the data of databases 102 will be consumed through the virtual database 106. The component 114 illustratively includes a mechanism that enables customized creation of data entities as an arbitrary set of the data tag elements created by way of the described functionality provided by the metadata manager. The component 114 illustratively also includes a mechanism that supports, on a customized basis, the definition of relationships between the data entities. The data entities illustratively can be grouped together as peers with 0 . . . N relationships between the entities. In one embodiment, component 114 also supports the application of security to the entities for both edit rights as well as data consumption rights. In one embodiment, data provided by way of component 114 is added to the metadata store 110 but this need not necessarily be the case, as the data can certainly be stored elsewhere without departing from the scope of the present invention.

In one embodiment, schema definition manager component 114 provides a user interface that supports manual, automated or semi-automatic creation of a set of table and columns using only the elements which exist in the metadata store 110 as a result of the tagging operations carried out in conjunction with the metadata manager component 112. This does not require any working knowledge of the physical structure of the underlying database(s) 102. The schema definition manager component 114, in essence, provides a "shopping cart" type experience wherein a user (e.g., an application developer that is a data consumer 104) can pick and choose the data elements they want and group them together into the concepts of tables without having to have any knowledge of the underlying structure of database(s) 102.

System 100 also includes a virtual schema generation service component 108. Service component 108 is illustratively an automated component that coalesces the inputs into the metadata manager component 112 and the schema definition component 114 so as to automatically generate a virtual schema that forms the core of the virtual database 106. In one embodiment, service component 108 functions by generating a database query statement for each entity defined in the schema definition manager component 114. For each entity, the service component 108 selects the components of the database query statement so as to directly reflect the database vectors included within the data tags assigned to the entity, as recorded in the metadata store based on inputs to the metadata manager component 112. In one embodiment, the schema generation service component 108 then generates a single map of entities expressed with their newly generated database query. The service component 108 then uses the entity definition map to present data consumer 104 with the virtual schema, which supports data navigation through traditional data protocols.

In one embodiment, generation service component 108 is further configured to translate requests for data (e.g., requests formatted so as to be consistent with a schema established for the virtual database 106) received from the data consumer 104 by identifying the corresponding generated database query statements. The corresponding database query statements are executed so as to retrieve corresponding data from the database(s) 102. That retrieved corresponding data is then delivered to the data consumer 104 in response to their request. The data is illustratively delivered through a traditional data protocol such as, but not limited to, TCP/IP, HTTP, SOAP, REST, etc. The physical delivery mechanism is client and configuration dependent. Delivery can be in a format that is consumable on all platforms. This enables true interoperability between the data sources 102 and the data consumer 104 (i.e., a data consuming application).

In one embodiment, the combination of input captured by the metadata manager component 112 (e.g., the data tags descriptive of details of database or databases 102) and the input captured by the schema definition manager 114 is collectively referred to as a data consumption profile. The virtual schema generation service enables a given data consumer 104 (e.g., a given application) to adapt their own data consumption profile and interact accordingly with data across one or more databases 102. The automatic generation of the virtual database schema merges the inputs received from components 112 and 114 so as to support generation of a virtual database interface having a schema-tized format.

Accordingly, after a user submits desired schema characteristics (i.e., by way of component 114), the tables and elements specified therein (which essentially reference the tagging metadata provided by way of component 112) are processed by service 108. In particular, service 108 attaches mappings that indicate how to access the underlying data components of database(s) 102. The data vectors indicated in the metadata generated by way of component 112 are processed by an algorithm so as to generate corresponding database queries. In essence, service 108 takes the conceptual schema defined by way of component 114 and makes it "real" by adding in the mappings. The result is the customized virtual database 106, against which the data consumer 104 can program, etc.

In one embodiment, an application associated with data consumer 104 is configured to interact with the virtual database 106, which matches their expectations as expressed in the input provided by way of component 114. By way of this interaction, the application indirectly interacts as necessary with the data of database(s) 102 based on queries that reflect the vectors indicated in the input made by way of component 112.

Figure 2:
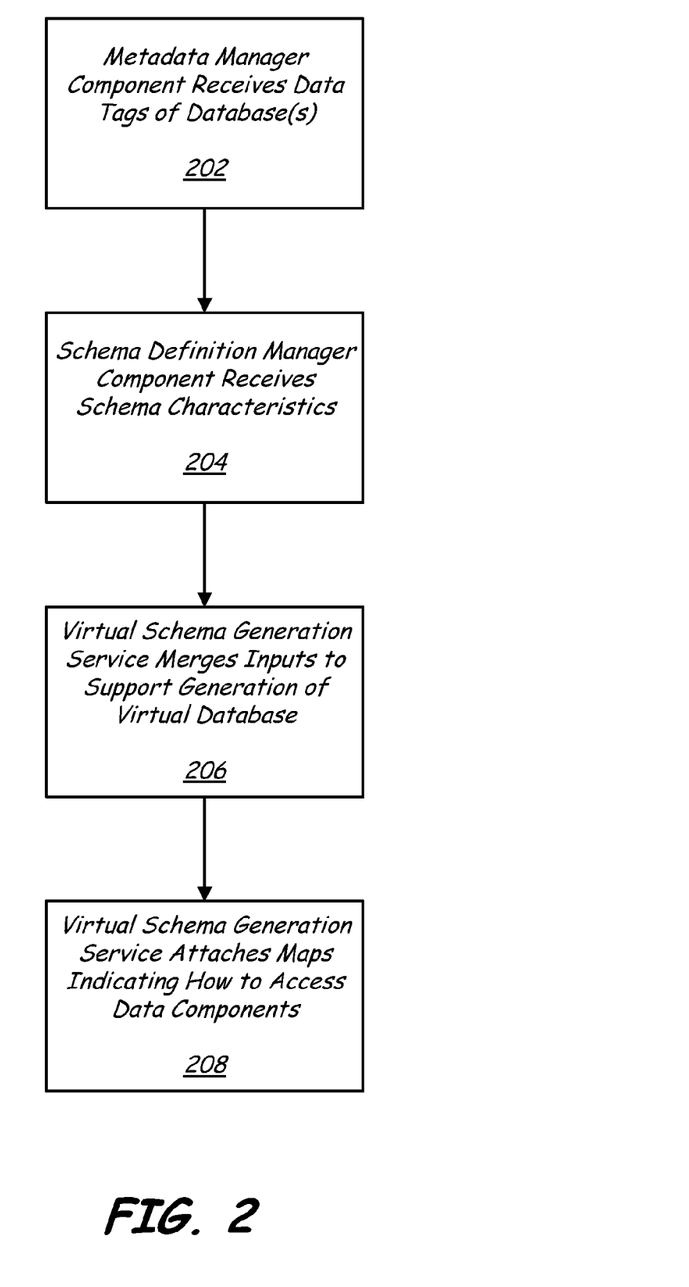
FIG. 2 is a flow diagram illustrating one embodiment of overall operation of the system shown in FIG. 1.

FIG. 2 is a flow diagram illustrating one embodiment of overall operation of the system shown in FIG. 1. In accordance with block 202, the metadata manager component 112 receives data tags descriptive of details of one or more databases 102. In accordance with block 204, the schema definition manager component 114 receives, for a given data consumer 104, desired schema characteristics in a format that references the tagging metadata provided by way of component 112. In accordance with block 206, the virtual schema generation service 108 automatically merges the inputs received from components 112 and 114 so as to support generation of a virtual database 106 that includes a virtual database schema consistent with the desired schema characteristics selected by way of component 114. As is indicated by block 208, as part of the generation of the virtual database, service 108 attaches mappings that indicate how to access the data components of database(s) 102 that correspond to the desired schema characteristics. In one embodiment, the data vectors indicated in the metadata generated by way of component 112 are run through an algorithm so as to generate corresponding database queries.

Figure 3:
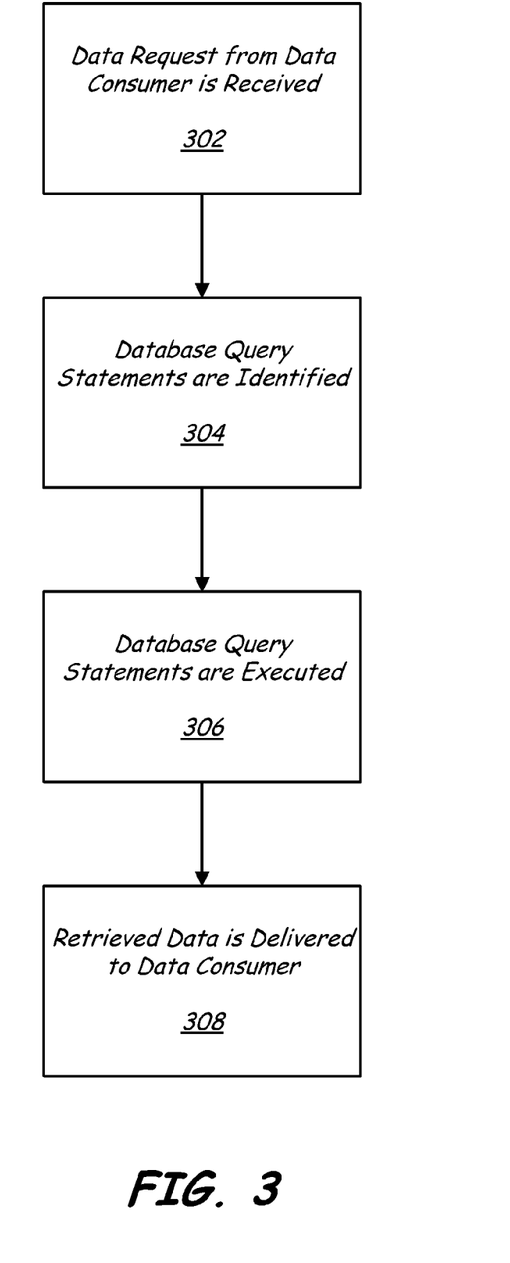
FIG. 3 is a flow diagram illustrating another embodiment of operation of the system shown in FIG. 1.

FIG. 3 is a flow diagram illustrating another embodiment of operation of the system shown in FIG. 1. In accordance with block 302, a request for data is received from the data consumer 104. The received request is illustratively a data call formatted so as to be consistent with a schema established for the virtual database 106. In accordance with block 304, database query statements (established for the virtual database 106) that correspond to the received request are identified. In accordance with block 306, the database query statements are executed so as to retrieve corresponding data from the database(s) 102. In accordance with block 308, the retrieved data is then delivered to the data consumer 104 in response to their request.

Figure 4:
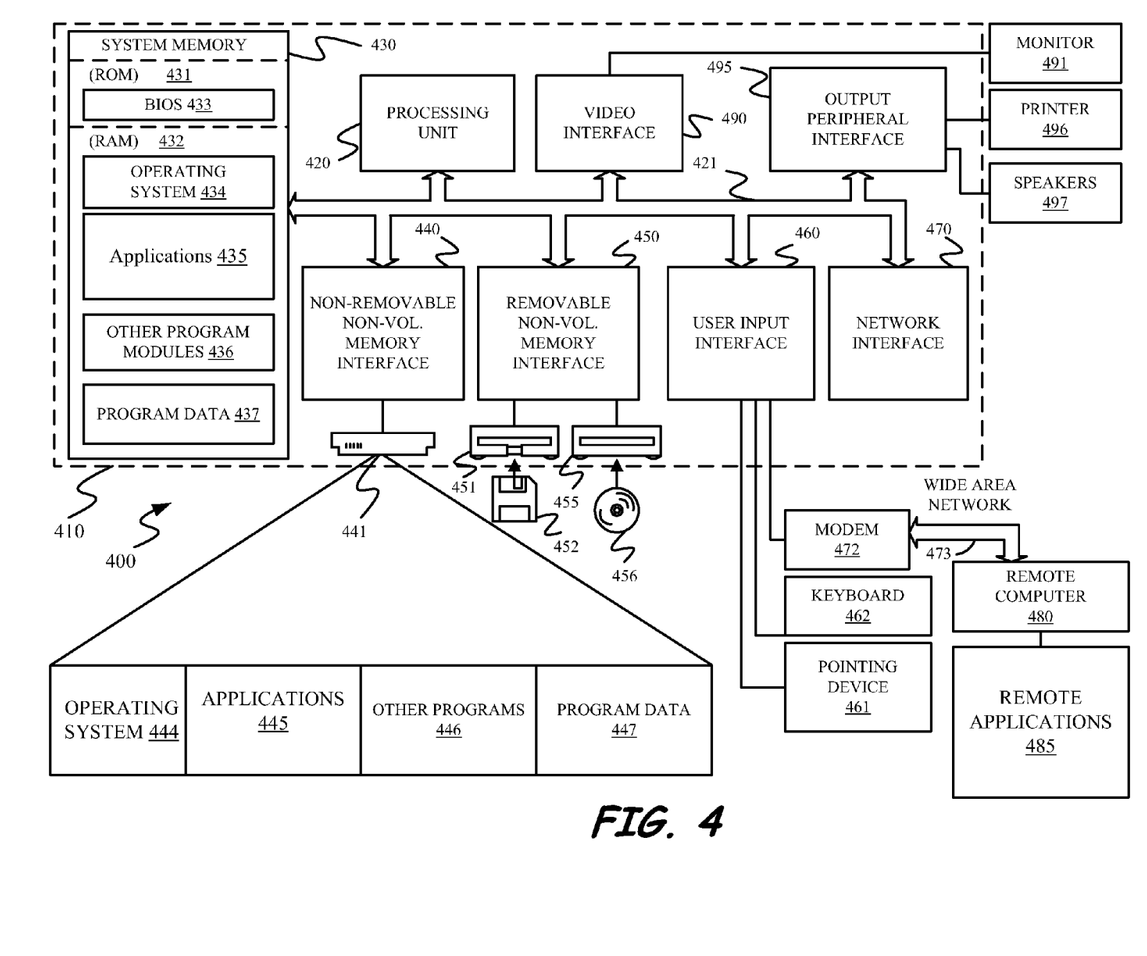
FIG. 4 is a block diagram illustrating one exemplary computer hardware environment in which the system of FIG. 1 can be deployed.

FIG. 4 is one embodiment of a computer hardware environment in which the invention can be used. With reference to FIG. 4, an exemplary system for implementing some embodiments includes a general-purpose computing device in the form of a computer 410. Components of computer 410 may include, but are not limited to, a processing unit 420 (e.g., a computer processor), a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437. Components (e.g., components 108, 112, 114, etc.) of system 100 discussed above in relation to FIG. 1 can be stored in other program modules 436 or elsewhere, including being stored remotely.

The computer 410 may also include other removable/non-removable volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies.

A user may enter commands and information into the computer 410 through input devices such as a keyboard 462, a microphone 463, and a pointing device 461, such as a mouse, trackball or touch pad. Other input devices (not shown) may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 is operated in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on remote computer 480. It will be appreciated that the network connections shown are exemplary and other means of establishing a communications link between the computers may be used.

As mentioned above, components (e.g., components 108, 112, 114, etc.) of system 100 discussed above in relation to FIG. 1 can be implemented using processing unit 420 and any of a variety of the computer storage components discussed in relation to FIG. 4. In addition, the components (e.g., components 108, 112, 114, etc.) can be implemented by activating processing unit 620 to perform methods such as those described above in relation to FIGS. 2 and 3.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
receiving an indication of a data entity, the indication referencing a set of multiple data tag elements including a first data tag element and a second data tag element, wherein the first data tag element includes a first data vector that identifies a location in a first database where data corresponding to the first data tag element is stored and the second data tag element includes a second data vector that identifies a location in a second database where data corresponding to the second data tag element is stored, wherein the data corresponding to the first and the second data tag elements are in different formats, the first data tag element including an indication of a virtual database schema identifying a unified entry that points to and unites the first data tag element and the second data tag element, and wherein the data corresponding to the first and the second data tag elements are presented as a single entry;
utilizing a computer processor that is a component of a computing device to automatically refer to the indication of the data entity and generate a corresponding query statement that is indicative of the location in the first database and the location in the second database; and
presenting the data entity in a format specified by the virtual database schema, wherein the data corresponding to the first and the second data tag elements in the different formats are joined together utilizing a join function.

2. The method of claim 1, wherein the first data vector identifies the first database and the second data vector identifies a second database, the first database being separate and distinct from the second database, and wherein the data entity is presented as belonging to a virtual database specified by the virtual database schema that is separate and distinct from the first and the second databases.

3. The method of claim 1, wherein the first data vector identifies the first database, and wherein the first data tag element includes an indication of a data tag publisher.

4. The method of claim 1, wherein the first data vector identifies a database table in the first database where the data corresponding to the first data tag is stored, and wherein the first data tag element includes an indication of a data tag version.

5. The method of claim 1, wherein the first data vector identifies a column or row in the first database where the data corresponding to the first data tag is stored, and wherein the first data tag element includes a default name and a default type.

6. The method of claim 1, and further comprising:
receiving a data request from a data consuming application, wherein the data request identifies the entity;
processing the query relative to the first database so as to retrieve the data corresponding to the first data tag;
responding to the data request from the data consuming application by providing the data consuming application with the data corresponding to the first data tag; and
receiving the indication of the data entity and the first data tag as manual inputs.

7. The method of claim 6, wherein providing the data consuming application with the data corresponding to the first data tag further comprises providing to the data consuming application, along with the data corresponding to the first data tag, data from a second database that is retrieved when the query is processed relative to the second database, and wherein the first data tag is stored to a metadata store that is separate and distinct from the first and the second databases.

8. A computer-implemented method comprising:
receiving a data request from a data consuming application, wherein the data request identifies an entity;
retrieving a database query that is identified as being associated with the entity, the database query being automatically generated by a computer processor that is a component of a computing device by accessing a unified entry in a virtual database that points to and unites a plurality of data tags selectively assigned to the entity such that parameters of the query are automatically selected by the processor based on a plurality of data vectors that identify database locations of data assigned to the plurality of data tags, wherein data having different formats assigned to the plurality of data tags are joined together utilizing a join function and presented as a single entry; and
utilizing the database query to identify properties for each of the plurality of data tags in a metadata store.

9. The method of claim 8, and further comprising:
processing the database query so as to retrieve a collection of data; and
wherein the properties for each of the plurality of tags include a unique identifier, an element name, an element source, and an element description.

10. The method of claim 9, and further comprising:
responding to the data request from the data consuming application by providing the data consuming application with the collection of data; and
wherein the properties for each of the plurality of tags further include a schema default name, a schema default data type, a source data location, a data tag publisher, and a data tag version.

11. The method of claim 8, wherein the plurality of data tags are selectively assigned by a user to the entity utilizing a user interface generated by a schema definition manager component.

12. The method of claim 8, wherein each of the plurality of data vectors indicates a different physical database in which at least a portion of the collection of data is stored, and wherein the different physical databases are presented as a single virtual database.

13. The method of claim 8, wherein each of the plurality of data vectors indicates a server, a database, a table, a row, and a column in which at least a portion of the collection of data is stored.

14. A database system, comprising:
a plurality of source databases;
a metadata manager component that facilitates creation of a first data tag and a second data tag, wherein the first data tag includes an indication of a first data vector that identifies where in a first of the plurality of source databases a first item of data is stored, and wherein the second data tag includes an indication of a second data vector that identifies where in a second of the plurality of source databases a second item of data is stored;
a schema definition manager component that facilitates creation of a data entity, wherein the data entity includes a grouping of the first data tag with the second data tag, wherein the schema definition manager component supports an implementation of edit rights and data consumption rights for the first and second items of data; and
a computer processor that is a component of a computing device that utilizes a virtual schema generation service component to generate a virtual database schema identifying a unified entry that points to and unites the first data tag and the second data tag, wherein the first and second items of data are in different formats and presented as a single entry, and wherein generating the virtual database schema comprises analyzing the data entity and, based on the grouping of the first data tag with the second data tag, automatically generating and storing a database query statement that, when executed, causes a retrieval of the first and second items of data wherein the first and second items of data in the different formats are joined together utilizing a join function.

15. The system of claim 14, wherein said creation of the data entity comprises user-initiated creation of the data entity by manually picking and choosing data elements to be grouped together into tables.

16. The system of claim 14, wherein the first data tag includes a specific reference to the first of the plurality of source databases, wherein the second data tag includes a specific reference to a second of the plurality of source databases, and wherein the first and the second of the plurality of source databases are presented as a single virtual database that is formatted in accordance with the virtual database schema.

17. The system of claim 14, wherein the first data tag includes a reference to a specific table in the first of the plurality of source databases, and wherein at least some of the plurality of source databases include healthcare information.

18. The system of claim 17, wherein the second data tag includes a reference to a specific table in the second of the plurality of source databases, and wherein the first and the second data tags are linked together utilizing a SQL operation.

19. The system of claim 14, wherein the first data tag includes a reference to a specific column or row in the first of the plurality of source databases, and wherein the first item of data is associated with an object.

20. The system of claim 14, wherein the second data tag includes a reference to a specific table in the second of the plurality of source databases, and wherein the system includes a record of a person or automated system that applied the first and the second tags.

\* \* \* \* \*